US012669003B2

(12) United States Patent
Lee

(10) Patent No.: US 12,669,003 B2
(45) Date of Patent: Jun. 30, 2026

(54) SPRING AND TROLLEY BRACKET

(71) Applicant: OVERHEAD DOOR CORPORATION, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 207 days.

(21) Appl. No.: 18/392,530

(22) Filed: Dec. 21, 2023

(65) Prior Publication Data

US 2025/0207445 A1 Jun. 26, 2025

(51) Int. Cl.
*E05D 13/00* (2006.01)

(52) U.S. Cl.
CPC ...... *E05D 13/1261* (2013.01); *E05Y 2600/51* (2013.01); *E05Y 2600/626* (2013.01); *E05Y 2900/106* (2013.01)

(58) Field of Classification Search
CPC ............ E05D 13/1261; E05D 13/1269; E05F 15/681; E05F 15/684; E05F 15/686; E05F 15/668; E05Y 2900/106; E05Y 2600/51
See application file for complete search history.

(56) References Cited

U.S. PATENT DOCUMENTS 2,201,636 A * 5/1940 Siess .................. E05D 13/1261 160/202
3,616,575 A * 11/1971 Harris .................. E05F 15/684 49/200
5,188,163 A * 2/1993 Schwartzengraber ...................... E05F 15/668 160/229.1
5,964,268 A * 10/1999 Carper ............... E05D 13/1215 16/DIG. 7
6,554,047 B1 * 4/2003 Mondragon ............ E05D 15/24 160/188
7,665,504 B2 * 2/2010 Schulze ................ E05F 15/668 16/DIG. 1
7,802,607 B2 * 9/2010 Crider ....................... E06B 9/54 160/89
9,027,281 B2 * 5/2015 Shalom .................. E05D 15/38 49/197
10,422,708 B2 * 9/2019 Mello, II ............. G01L 5/0061
2003/0197317 A1 * 10/2003 Meisel ................. E05F 15/668 267/140.11

OTHER PUBLICATIONS

Amazon.com, Liftmaster Garage Door Opener Header Bracket Assembly Genuine Original Equipment L8, pp. 1-6 [online], [retrieved on May 2, 2024]. Retrieved from the Internet <URL:https://www.amazon.com/Chamberlain-Assembly-Original-Equipment-Manufacturer/dp/B00NSY37Y6/ref=asc_df_B00NSY37Y6>.

(Continued)

*Primary Examiner* — Abe Massad
(74) *Attorney, Agent, or Firm* — Haynes and Boone, LLP

(57) ABSTRACT

A one-piece bracket is usable to secure a garage door system. The bracket includes a spring mount configured to secure a torsion spring of a movable barrier system; a trolley mount configured to secure a trolley track of a movable barrier system; and a spine portion extending between and connecting the spring mount to the trolley mount in a fixed relationship. At least one of the spring mount, the trolley mount, and the spine portion includes a mounting portion for fixation of the bracket to a structure.

19 Claims, 13 Drawing Sheets

(56) References Cited

OTHER PUBLICATIONS

All Security Equipment, Liftmaster Header Bracket Replacement Kit | LIF-K10-10205, pp. 1-4 [online], [retrieved on May 2, 2024]. Retrieved from the Internet <URL: https://allsecurityequipment.com/products/liftmaster-k10-10205>.

Findit Parts, Fleet Engineers 027-20400—Operator Single Spring Operator Bracket Left, pp. 1-6 [online], [retrieved May 2, 2024]. Retrieved from the Internet <URL: https://www.finditparts.com/products/294677/fleet-engineers-027-20400>.

Amazon.com, Garage Door Spring Anchor Center Plate w/Bearing 3 3/8 inch Residential, pp. 1-5, [online], [retrieved May 3, 2024]. Retrieved from the Internet <URL: https://www.amazon.com/Garage-Spring-Anchor-Bearing-Residential>.

NSCD, Garage Door Spring Anchor Bracket, Notched, pp. 1-6 [online], [retrieved May 3, 2024]. Retrieved from the Internet <URL: https://www.northshorecommercialdoor.com/gadospanbrno.html>.

* cited by examiner

SPRING AND TROLLEY BRACKET

TECHNICAL FIELD

The present disclosure relates generally to the field of movable barrier systems. More particularly, the present disclosure relates to a spring and trolley bracket of moveable barrier systems.

BACKGROUND

Movable barriers, such as upward-acting sectional or single panel garage doors, residential and commercial rollup doors, and slidable and swingable gates, are used to alternatively allow and restrict entry to building structures and property. A commonly used movable barrier is an upward-acting barrier. The weight of movable barriers are often counterbalanced using a torsion system. The torsion system is often attached to the wall above the door of the movable barrier by a spring bracket. It is common for movable barriers to be driven automatically by a movable barrier operator having a trolley track. Like the torsion system, the trolley track is usually attached to the wall above the door of the movable barrier using a separate trolley bracket.

Installation of the spring bracket is typically done by a trained professional because torsion systems operate under extremely large loads and can pose a risk to those who work on or in close proximity to the torsion systems. In this way, mounting the trolley bracket to the wall can be an intimidating task because the trolley bracket may be mounted in close proximity to the torsion system after the torsion system is already in place. In some instances, untrained persons install the trolley bracket themselves. Furthermore, mounting the trolley bracket can be burdensome and time-consuming due to its placement near the spring bracket of the torsion system and because its installation is separate from the installation of the spring bracket. Therefore, there is a need for a one-piece spring and trolley bracket.

SUMMARY

The examples of the invention are summarized by the claims that follow the description.

Consistent with some examples, a one-piece bracket for securing a garage door system may comprise a spring mount configured to secure a torsion spring of a movable barrier system, a trolley mount configured to secure a trolley track of a movable barrier system, and a spine portion extending between and connecting the spring mount to the trolley mount in a fixed relationship. At least one of the spring mount, the trolley mount, and the spine portion may comprise a mounting portion for fixation of the bracket to a structure.

In some examples, the spring mount, the trolley mount, and the spine portion may be formed from a single piece of material. The mounting portion may comprise a flat surface configured to abut against the structure. The spring mount may comprise a part of the mounting portion and at least one arm extending substantially transverse to the flat surface. The at least one arm of the spring mount may comprise an upper arm and a lower arm, the upper and lower arms being vertically separated to define an opening therebetween for receiving the torsion spring. The lower arm may comprise a proximal end attached to the mounting portion and a distal end, the distal end having a lip for maintaining the torsion spring within the opening while the torsion spring is secured using fasteners.

In some examples, the trolley mount may comprise a part of the mounting portion and at least one arm extending substantially transverse to the flat surface. The at least one arm of the trolley mount may comprise a first arm and a second arm, the first and second arms being horizontally separated to define a first width therebetween for receiving the trolley track. The at least one arm of the trolley mount may further comprise a third arm, the second and third arms being horizontally separated to define a second width therebetween for receiving the trolley track, the first width being greater than the second width. The at least one arm of the trolley mount may further comprise a third arm and a fourth arm, the third and fourth arms being horizontally separated to define a second width therebetween for receiving the trolley track, the first width being greater than the second width.

Consistent with some examples, a movable barrier system may comprise a one-piece bracket mounted to a structure by a mounting portion. The one-piece bracket may comprise a spring mount, a trolley mount, and a spine portion extending between and connecting the spring mount to the trolley mount in a fixed relationship, at least one of the spring mount, the trolley mount, and the spine portion may comprise the mounting portion. The movable barrier system may also comprise a torsion system secured to the spring mount, and a barrier operator system secured to the trolley mount.

In some examples, the one-piece bracket may be formed from a single piece of material. A flat surface of the mounting portion may be abutted against the structure. A torsion spring of the torsion system may be secured to the spring mount. The spring mount may comprise an upper arm and a lower arm vertically separated to define an opening therebetween, and rotation of the torsion spring with respect to the one-piece bracket may be limited using an anchor.

In some examples, a trolley track of the barrier operator system may be secured to the trolley mount. The trolley mount may comprise a first arm and a second arm, the first and second arms being horizontally separated to define a first width therebetween for receiving the trolley track. The trolley mount may also comprise a third arm, the first and third arms being horizontally separated to define a second width therebetween for receiving the trolley track, the first width being greater than the second width. The trolley mount may comprise a first arm and a second arm, the first and second arms being horizontally separated to define a first width therebetween for receiving the trolley track. The trolley mount may further comprise a third arm and a fourth arm, the third and fourth arms being horizontally separated to define a second width therebetween for receiving the trolley track, the first width being greater than the second width.

Consistent with some examples, a method for securing a movable barrier system to structure may comprise mounting a one-piece bracket to the structure. The bracket may comprise a spring mount, a trolley mount, and a spine portion extending between and connecting the spring mount to the trolley mount in a fixed relationship. The method may also comprise securing a torsion spring to the spring mount and securing a trolley track to the trolley mount.

In some examples, at least one of the spring mount, the trolley mount, and the spine portion may comprise a mounting portion. Mounting the bracket to the structure may comprise abutting a flat surface of the mounting portion against the structure.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

The accompanying drawings illustrate examples of the systems, devices, and methods disclosed herein and together with the description, serve to explain the principles of the present disclosure.

Figure 1:
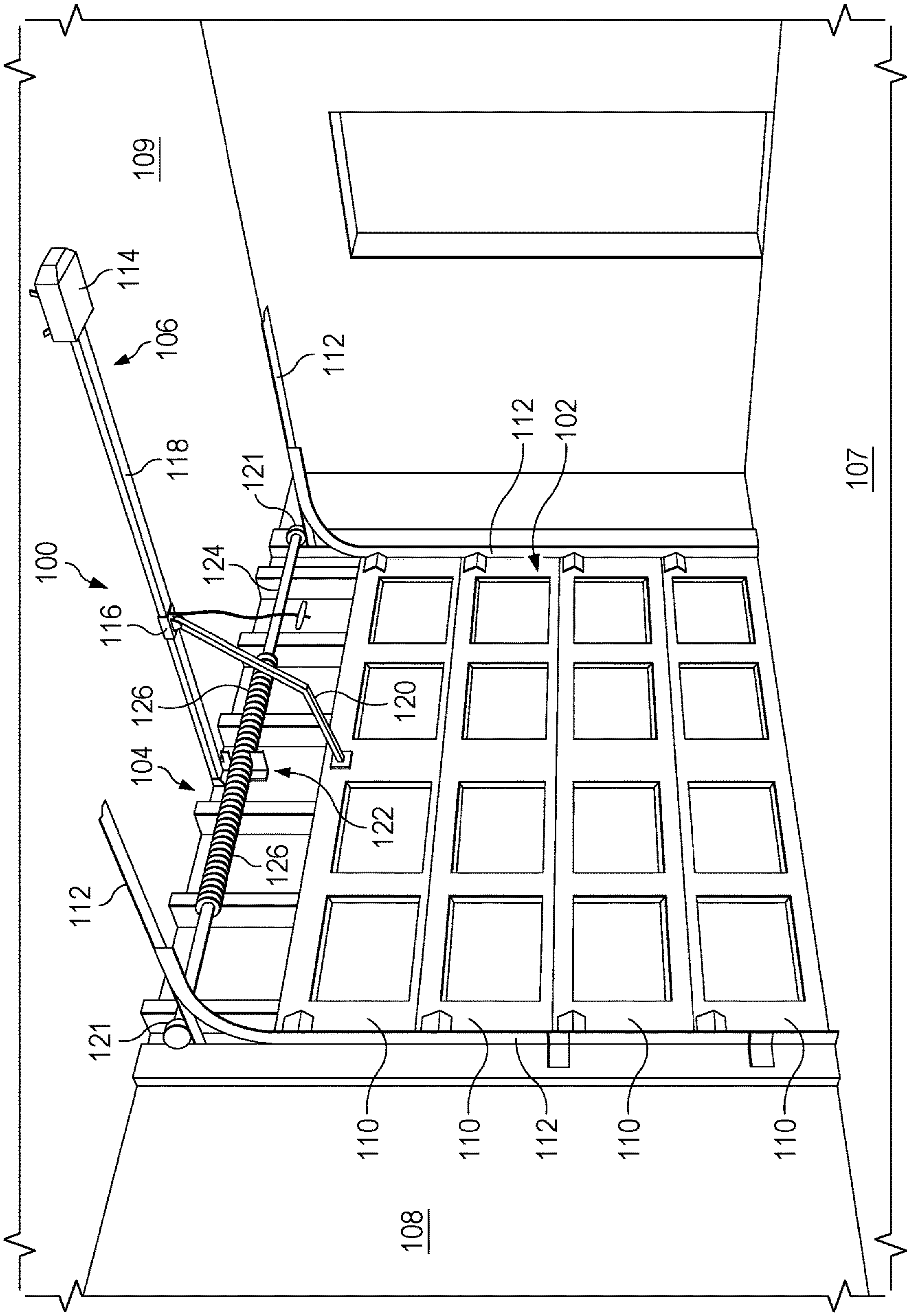
FIG. 1 is a perspective view of a movable barrier system, according to examples of the present disclosure.

These Figures will be better understood by reference to the following Detailed Description.

DETAILED DESCRIPTION

For the purpose of promoting an understanding of the principles of the present disclosure, reference will now be made to the examples illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more examples or Figures, when those same elements or features appear in subsequent Figures, without such a high level of detail. It is fully contemplated that the features, components, and/or steps described with respect to one or more examples or Figures may be combined with the features, components, and/or steps described with respect to other examples or Figures of the present disclosure. For simplicity, in some instances the same or similar reference numbers are used throughout the drawings to refer to the same or like parts.

FIG. 1 shows an example movable barrier system 100. In some examples, the movable barrier system 100 described herein may be referred to as a barrier system, a door system, a garage door system, a gate system, or any other similar term. The movable barrier system 100 includes a movable barrier 102, a torsion system 104, and a barrier operator system 106, among other components. In some examples, the movable barrier 102 may be referred to as a barrier, a door, a garage door, a sectional garage door, an upward acting garage door, a gate, a movable gate, a sliding gate, or any other similar term. The torsion system 104 may be part of the movable barrier 102, part of the barrier operator system 106, part of both, or separate from both. The barrier operator system 106 may be referred to as an operator, a door operator, a garage door operator, a gate operator, an opener, a door opener, a garage door opener, a gate opener, a control system, or any other similar term.

The movable barrier 102 provides access to a space or a room having a floor 107, walls 108, and a ceiling 109. In some examples, the movable barrier 102 may include a plurality of horizontally-extending sections 110 that are vertically stacked. The sections 110 may include various panels including opaque, transparent, or semi-transparent panels. The movable barrier 102 may provide selective access to the space. In this example, the movable barrier 102 is an upward acting garage door. In some examples, the movable barrier 102 may be a sectional-type garage door or any other suitable type of movable barrier. The movable barrier 102 is movable between open and closed positions along barrier tracks 112. The barrier tracks 112 are affixed to the wall 108 on both sides of an opening defined by the wall 108. In some examples, the barrier tracks 112 are also affixed to the ceiling 109. In some examples, the movable barrier 102 may include one or more rolling or sliding components sized and shaped to fit within and move in a longitudinal direction along the barrier tracks 112. The rolling or sliding components may be affixed on either side of the movable barrier 102.

The torsion system 104 counterbalances the weight of the movable barrier 102 as the movable barrier 102 is raised and lowered either manually or using the barrier operator system 106. The torsion system 104 may include cable drums 121, a shaft or bar 124, and one or more torsion springs 126, and safety cables, among other components. As the movable barrier 102 is opened, the torsion spring 126 unwinds, releasing stored energy to help lift the movable barrier 102. Conversely, as the movable barrier 102 closes, the torsion spring 126 rewinds, acting against the weight of the movable barrier 102.

The barrier operator system 106 facilitates the automatic opening and closing of the movable barrier 102. In this example, the barrier operator system 106 includes a ceiling mounted barrier operator 114 mounted to the ceiling 109. In some examples, the barrier operator system 106 may include a jackshaft operator, a direct drive wall operator, a belt driven operator, a chain driven operator, a screw drive operator, a trolley operator, a carriage operator, or any other suitable type of barrier operator. The barrier operator system 106 may include any suitable components. In some examples, the barrier operator 114 may be positioned at any other location besides the ceiling 109 within the room shown in FIG. 1. For example, the barrier operator 114 may be positioned on the walls 108 or the floor 107. The barrier operator system 106 includes other components to facilitate opening and closing of the movable barrier 102, for example, a motor, a drive mechanism, a trolley 116, a trolley track 118, and a door arm 120.

The movable barrier system 100 shown in FIG. 1 may include any other suitable components. For example, the movable barrier system 100 may include rollers positioned on the movable barrier 102 or the barrier tracks 112. Sensors, such as safety sensors can be configured to detect the presence or motion of an object or person, seals positioned along any portion of the movable barrier 102 or the corresponding opening, tracks, lift cables, or tube shafts. Extension springs may be included to further reduce necessary rotational force of a motor, a motor rail, belts, motor head, motor arms, lift handles for manual operation, emergency release ropes, or any other suitable components.

The movable barrier system 100 additionally includes the bracket 122. The bracket 122 is shown mounted to the wall 108. In some examples, the bracket 122 is mounted to a header (not shown). The bracket 122 may be the same or similar to brackets 222, 622, and 922 disclosed and described herein. The brackets described herein may secure the movable barrier 102, the torsion system 104, and/or and the barrier operator system 106 to the wall 108, the header, or any other structure. The brackets may be mounted or coupled to any portion of the wall 108. The bracket 122 is shown centered about the movable barrier 102. In some examples, the bracket 122 is off-centered with respect to the movable barrier 102 and is positioned along any portion of the torsion system 104.

The brackets described herein meet the disadvantages and shortcomings of conventional ways of securing a movable barrier system to structure. In conventional movable barrier systems, torsion systems and barrier operator systems are mounted separately and individually to a wall above a movable barrier using multiple brackets. In the examples disclosed herein, the brackets 122, 222, 622, and 922 are a one-piece spring and trolley bracket that secures both the torsion system 104 and the barrier operator system 106 to structure. Securing a movable barrier system to structure using a one-piece bracket as described herein may, for example, simplify the installation process, decrease installation time, decrease manufacturing costs by decreasing the number of components, decrease the amount of material used, and decrease the number of bends/cuts required for manufacture, among other things.

Figure 2A:
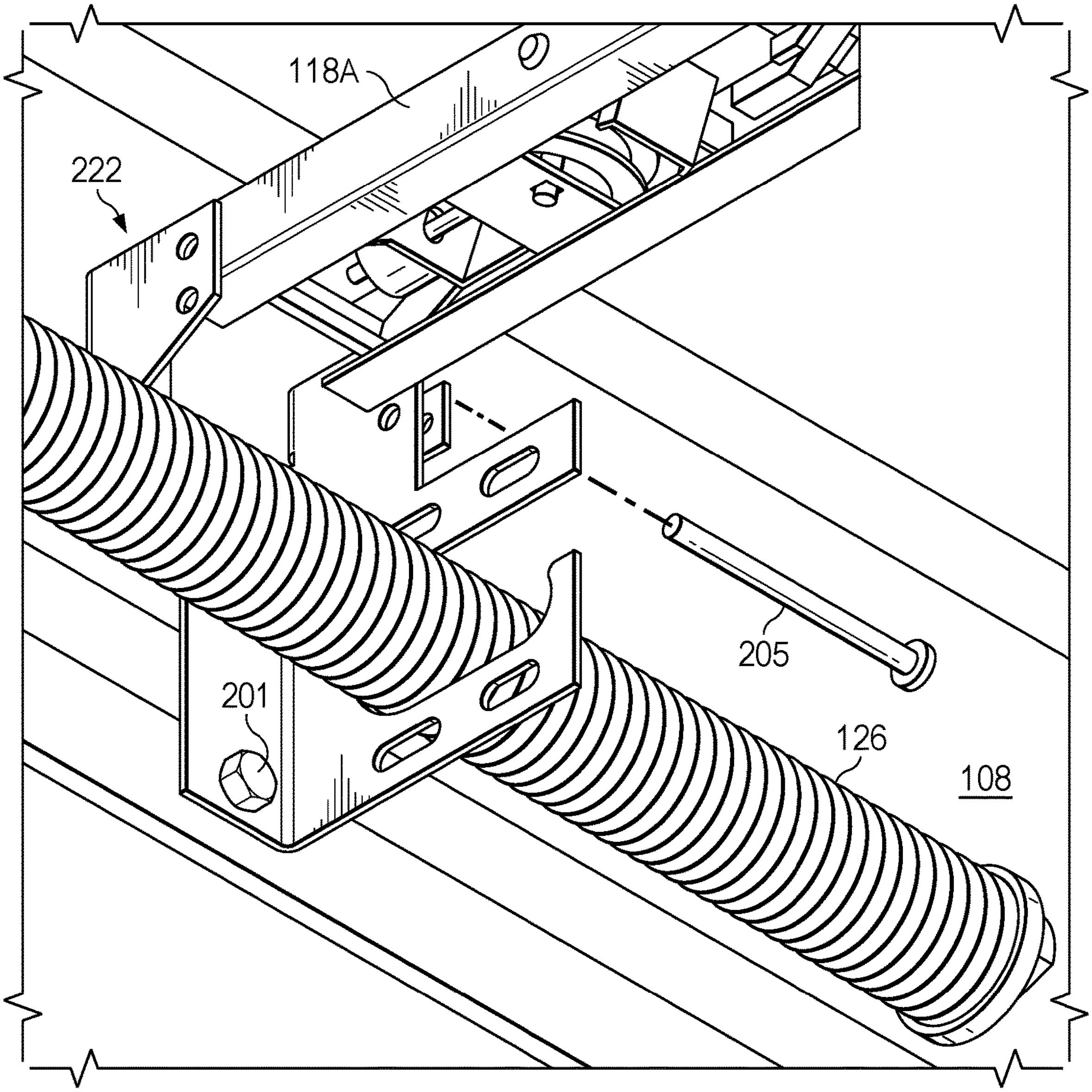
FIG. 2A is a perspective view of a torsion system and a barrier operator system secured to structure by a spring and trolley bracket, according to examples of the present disclosure.
Figure 2B:
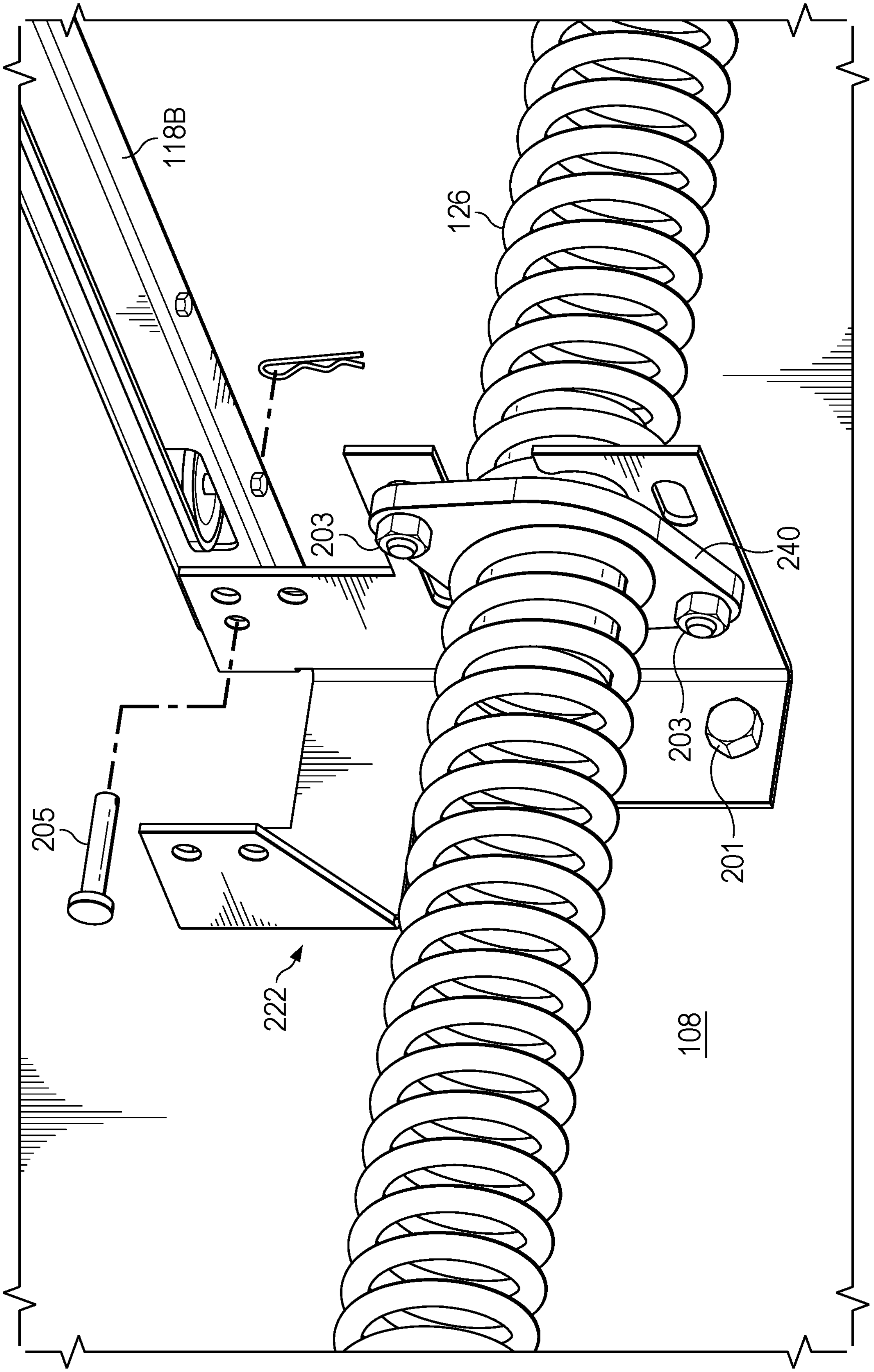
FIG. 2B is a perspective view of a torsion system and a barrier operator system secured to structure by a spring and trolley bracket, according to examples of the present disclosure.

FIGS. 2A and 2B show the torsion system 104 and the barrier operator system 106 attached to a bracket 222, the bracket 122 mounted to the wall 108 using the fasteners 201. The bracket 222 may be mounted to any other structure besides the wall 108, for example, the header or the ceiling 109. Any of the fasteners described throughout this disclosure may be bolts, screws, pins, cotter pins, clevis pins, or any other type of fastener. In some examples, the bracket 222 is mounted using other methods besides fasteners. For example, the bracket 222 may be adhered to the wall 108. Or the bracket 222 may be part of the wall 108 or the header itself.

More particularly, FIGS. 2A and 2B show the bracket 222 securing the torsion spring 126 and the trolley track 118 of the movable barrier system 100. In some examples, the torsion spring 126 is fastened to the bracket 222 using at least one fastener 203. Similarly, the trolley track 118, in some examples, is fastened to the bracket 222 using at least one fastener 205. In FIG. 2A, the bracket 222 is shown accommodating a wide trolley track 118A, while in FIG. 2B, the bracket 222 is shown accommodating a narrow trolley track 118B. In this way, the bracket 222 and other brackets described herein may be configured to accommodate and attach to a variety of torsion system 104 styles (e.g., trolley track 118 dimensions) and a variety of barrier operator system 106 styles (e.g., torsion spring 126 dimensions).

The brackets 122 and 222 in FIGS. 1, 2A, and 2B, are shown in use. For sake of brevity, this disclosure does not illustrate the example bracket 622 (see FIGS. 6-8) and the example bracket 922 (see FIGS. 9-11) in use. However, it is understood that any of the brackets described herein can be mounted and used in a fashion similar to the brackets 122 and 222.

Figure 3:
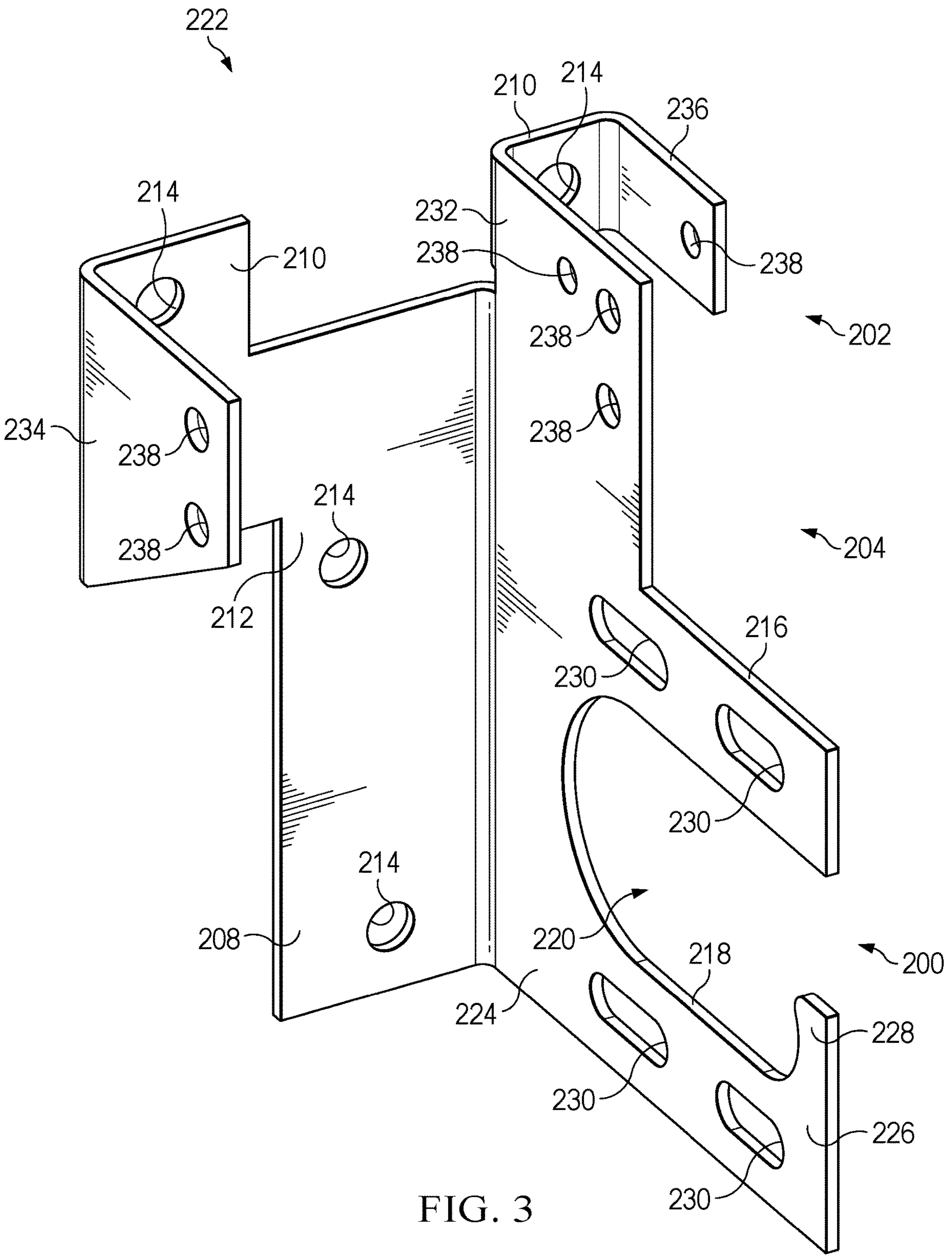
FIG. 3 is a perspective view of a spring and trolley bracket, according to examples of the present disclosure.

FIG. 3 shows the bracket 222 having a spring mount 200 and a trolley mount 202. A spine portion 204 extends between and connects the spring mount 200 and the trolley mount 202 in a fixed relationship. In this way, the bracket 222 is a one-piece bracket. Stated differently, the bracket 222 is an integrated spring and trolley bracket. In some examples, the spring mount 200, the trolley mount 202, and the spine portion 204 are formed from a single piece of material. During manufacturing, the bracket 222 may be cut from a single sheet of metal. The single piece of material may be cut, folded or otherwise deformed to form the spring mount 200, the trolley mount 202, and/or the spine portion 204.

Figure 4:
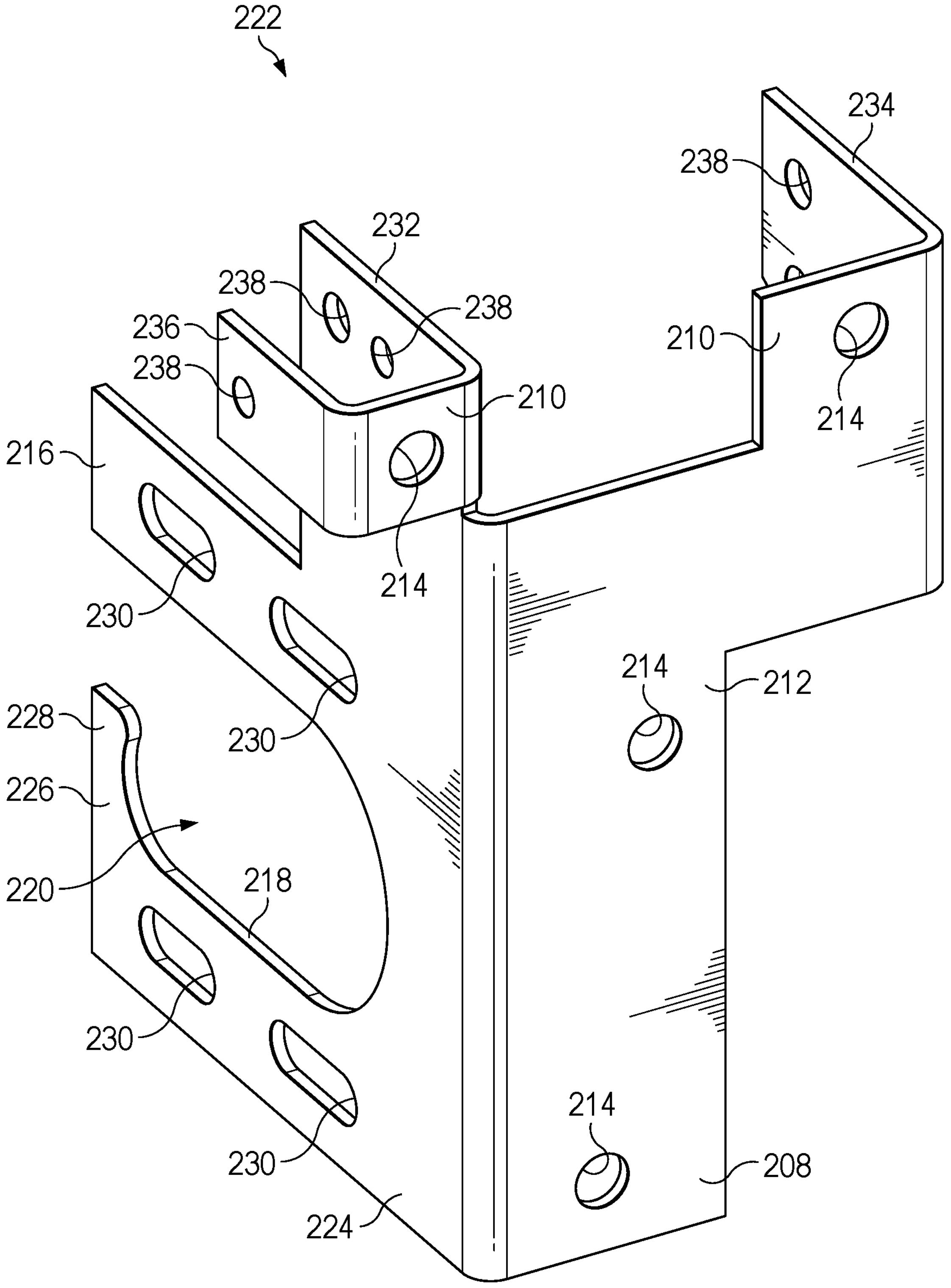
FIG. 4 is a perspective view of a spring and trolley bracket, according to examples of the present disclosure.

FIG. 4 is a perspective view illustrating a back side of the bracket 222. At least one of the spring mount 200, the trolley mount 202, and the spine portion 204 includes a mounting portion for fixation of the bracket 222 to a structure (e.g., the wall 108, the header). In some examples, the mounting portion includes a flat surface configured to abut against the structure, such as the wall. The mounting portion may include at least one mounting hole 214 sized to receive a fastener for mounting the bracket 222 to the structure the fastener (e.g. the fasteners 201). In some examples, all of the spring mount 200, the trolley mount 202, and the spine portion 204 include a mounting portion. For example, in the bracket 222 shown in FIGS. 2A and 2B, the spring mount 200 has a mounting portion 208, the trolley mount 202 has a mounting portion 210, and the spine portion 204 has a mounting portion 212, all shown as a single plate that abuts against a structure such as a wall. Collectively, the mounting portion is flat and defines the at least one mounting hole 214.

Turning back to FIG. 3, the spring mount 200 may include a part of the mounting portion and at least one arm extending substantially transverse to the flat surface of the mounting portion. For example, the spring mount 200 includes an upper arm 216 and a lower arm 218. In some examples, the upper arm 216 is of substantially the same length as the lower arm 218. The upper arm 216 and the lower arm 218 are vertically separated to define an opening 220 therebetween for receiving the torsion spring 126 or another component (e.g., the shaft) of the torsion system 104. A portion of the opening 220 may be curved to receive a curved surface of the torsion spring 126. The lower arm 218 has a proximal end 224 attached to the mounting portion and a distal end 226. The distal end 226 may have a lip 228 used for maintaining the torsion spring 126 within the opening 220 while the torsion spring 126 is secured to the bracket 222 using at least one fastener 203 (see FIG. 2B).

The fasteners 203 may secure the torsion spring 126 to the bracket 222 using the fastening holes 230. The fastening holes 230 may extend through the spring mount 200 and be substantially perpendicular or otherwise transverse to the flat surface of the mounting portion. In some examples, an anchor 240 (see FIG. 2B) is fastened to the spring mount 200 or the torsion spring 126 and extends between one fastening hole 230 on the upper arm 216 and one fastening hole 230 on the lower arm 218. The anchor 240 prevents the torsion spring 126 from rotating in relation to the bracket 222 and the wall 108. In this way, the torsion spring 126 is held with respect to the spring mount 200, the bracket 222 being mounted to structure. In some examples, the fastening holes 230 are oblong, allowing the anchor 240 to be secured to the spring mount 200 at a variety of different places. As such, based on where the anchor 240 is fastened to the spring mount 200, the dimensions of the opening 220 are variable. This allows the spring mount 200 to accommodate a variety of components, styles, shapes, and sizes of the torsion system 104.

The spine portion 204 extends between and connects the spring mount 200 and the trolley mount 202. The spine portion 204 integrates the spring mount 200 and the trolley mount 202 into a one-piece bracket. In some examples, as shown in FIG. 3, at least a part of the spine portion 204 is positioned vertically between the spring mount 200 and the trolley mount 202. In other examples, the spine portion 204 comprises all of the mounting portion, the spring mount 200 and the trolley mount 202 extending substantially perpendicularly from the spine portion 204.

The spine portion 204 provides additional support for the spring mount 200 and the trolley mount 202 and may increase the overall strength of the spring and trolley bracket 222. The spine portion 204, in some examples, provides additional surface area to be abutted against the wall 108 than if a spring bracket and a trolley bracket were used independent of one another. This is advantageous as it decreases the amount of stress applied to the wall 108 or the header, minimizing the chance that the bracket 222 will pull away from the wall 108 or the header due to the forces applied to the bracket 222 by the torsion system 104 and the barrier operator system 106.

Figure 5:
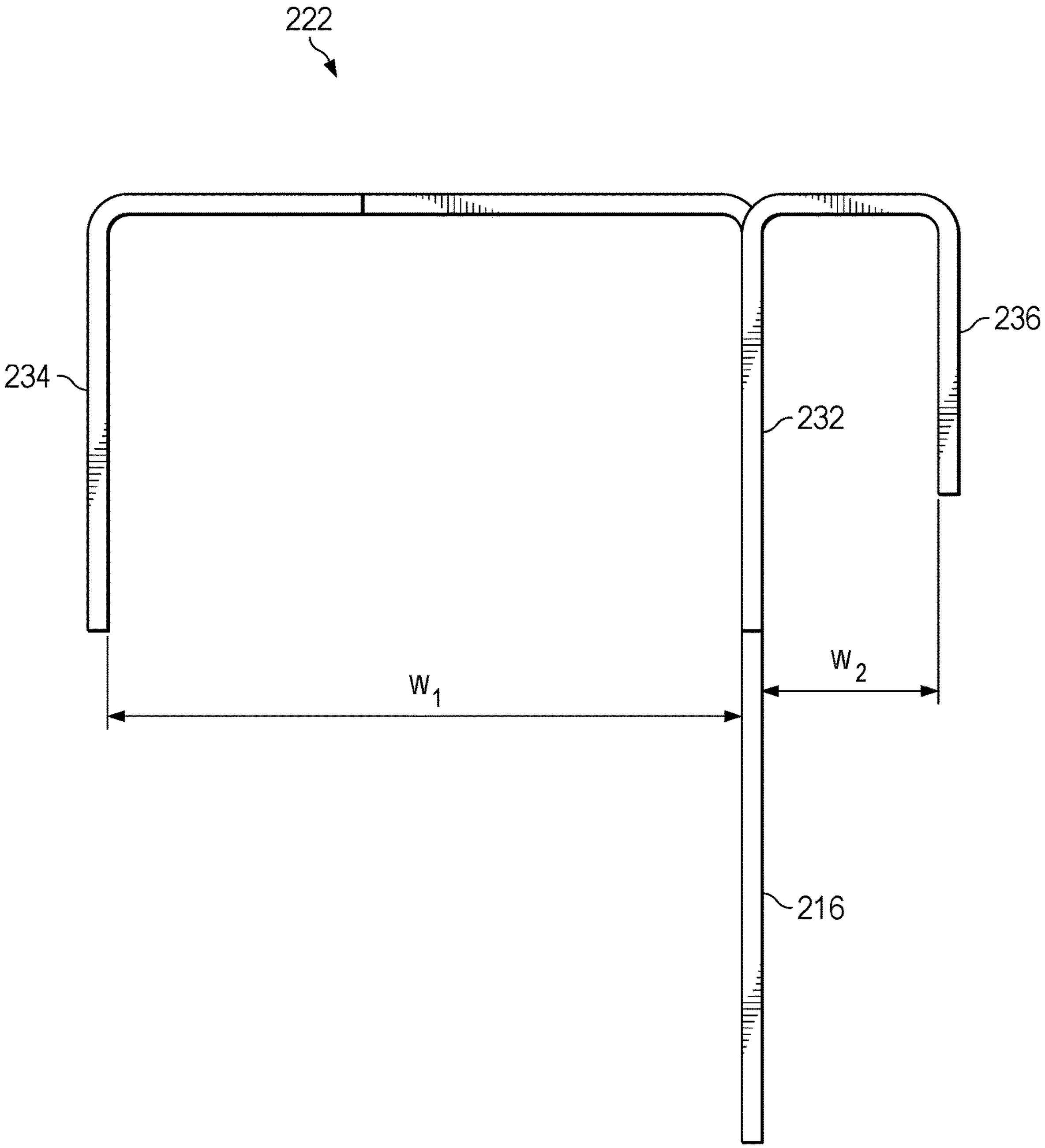
FIG. 5 is a top view of a spring and trolley bracket, according to examples of the present disclosure.

The trolley mount 202 may include a part of the mounting portion and at least one arm extending substantially transverse to the flat surface of the mounting portion. For example, the trolley mount 202 includes an arm 232 and an arm 234. As shown in FIG. 5, the arm 232 and the arm 234 are horizontally separated to define a width $W_1$ therebetween for receiving the wide trolley track 118A. The trolley mount 202 may further include another arm 236. The arm 236 and the arm 232 are horizontally separated to define a width $W_2$ for receiving the narrow trolley track 118B. The width $W_1$ may be greater than the width $W_2$. In this way, the bracket 222 is able to accommodate a variety of components (e.g., trolley tracks), styles, shapes, and sizes of barrier operator systems. In some examples, the width $W_2$ is greater than the width $W_1$. It is understood that in other examples the arms of the trolley mount 202 can be vertically separated to accommodate the trolley track 118.

At least one fastener (e.g., fastener 205) may secure the trolley track 118 to the bracket 222 using fastening holes 238. The fastening holes 238 may be placed at multiple locations on the at least one arm of the trolley mount 202 to provide further optionality during installation of the movable barrier system 100. As shown, the fastening holes 238 may be substantially perpendicular or otherwise transverse to the flat surface of the mounting portion.

Figure 6:
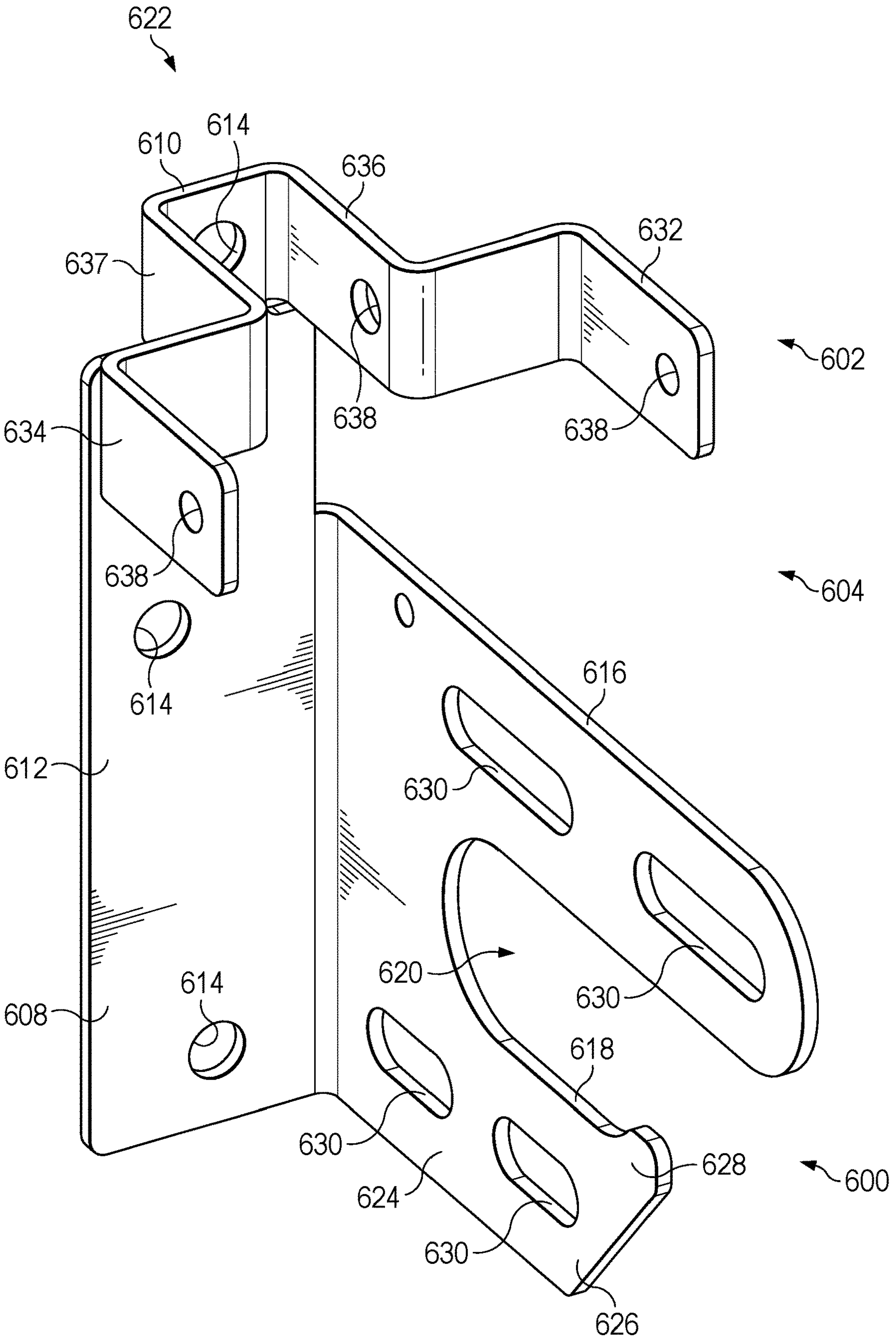
FIG. 6 is a perspective view of a spring and trolley bracket, according to examples of the present disclosure.

FIG. 6 shows the bracket 622 having a spring mount 600 and a trolley mount 602. A spine portion 604 extends between and connects the spring mount 600 and the trolley mount 602 in a fixed relationship. In this way, the bracket 622 is a one-piece bracket. Stated differently, the bracket 622 is an integrated spring and trolley bracket. In some examples, the spring mount 600, the trolley mount 602, and the spine portion 604 are formed from a single piece of material. During manufacturing, the bracket 622 may be cut from a single sheet of metal. The single piece of material may be folded or otherwise bent to form the spring mount 600, the trolley mount 602, and/or the spring portion 604.

Figure 7:
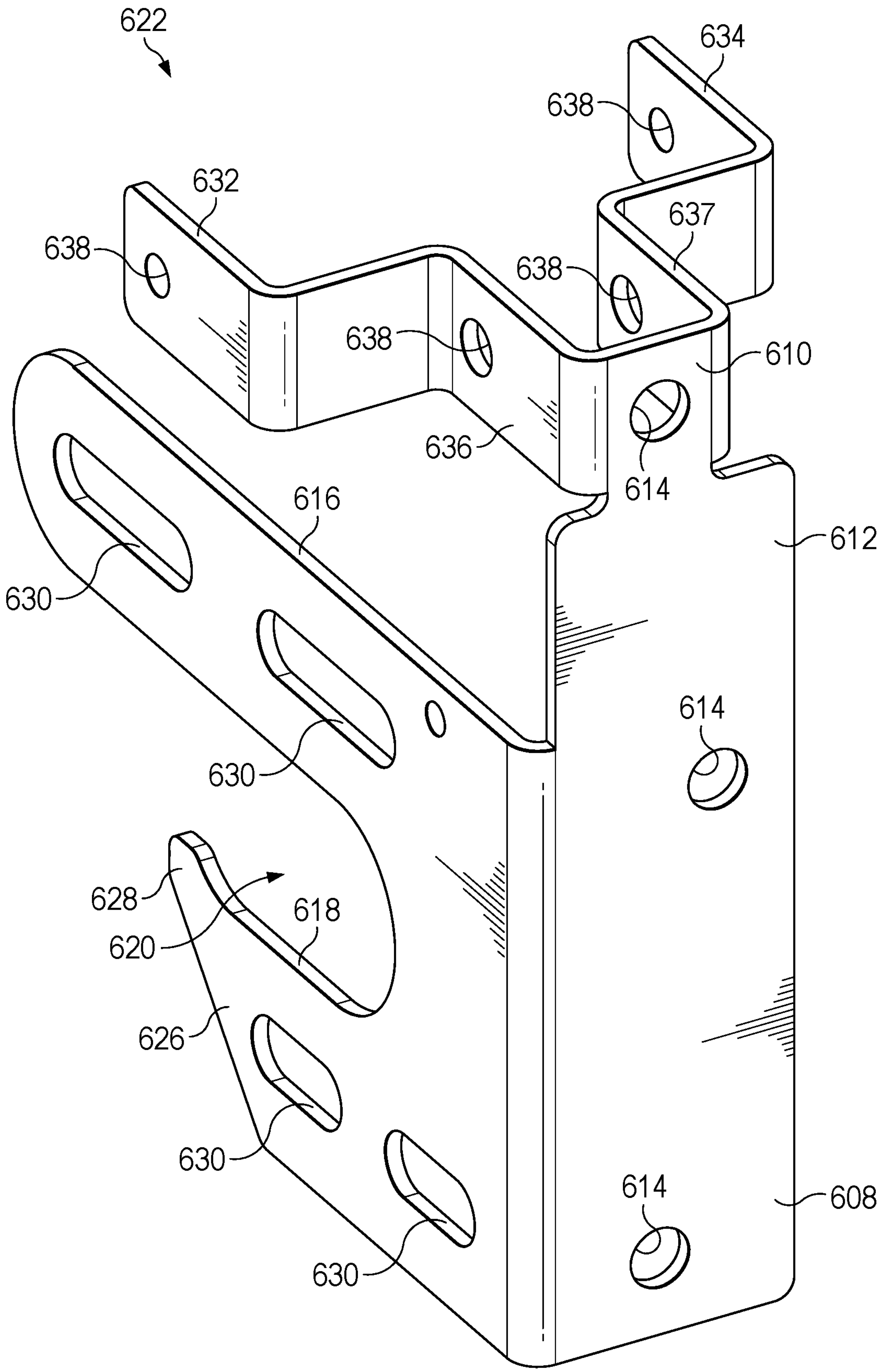
FIG. 7 is a perspective view of a spring and trolley bracket, according to examples of the present disclosure.

FIG. 7 is a perspective view illustrating a back side of the bracket 622. At least one of the spring mount 600, the trolley mount 602, and the spine portion 604 includes a mounting portion for fixation of the bracket 622 to a structure (e.g., the wall 108, the header). In some examples, the mounting portion includes a flat surface configured to abut against the structure. The mounting portion may define at least one mounting hole 614 for mounting the bracket 622 to the structure using at least one fastener (e.g. the fastener 201). In some examples, all of the spring mount 600, the trolley mount 602, and the spine portion 604 include a mounting portion. For example, the spring mount 600 has a mounting portion 608, the trolley mount 602 has a mounting portion 610, and the spine portion 604 has a mounting portion 612. Collectively, the mounting portion is flat and defines the at least one mounting hole 614.

Turning back to FIG. 6, the spring mount 600 may include a part of the mounting portion and at least one arm extending substantially transverse to the flat surface of the mounting portion. For example, the spring mount 600 includes an upper arm 616 and a lower arm 618. In some examples, the upper arm 616 is of greater length than the lower arm 618. The upper arm 616 and the lower arm 618 are vertically separated to define an opening 620 therebetween for receiving the torsion spring 126 or another component (e.g., the shaft) of the torsion system 104. A portion of the opening 620 may be curved to receive a curved surface of the torsion spring 126. The lower arm 618 has a proximal end 624 attached to the mounting portion and a distal end 626. The distal end 626 may have a lip 628 used for maintaining the torsion spring 126 within the opening 620 while the torsion spring 126 is secured to the bracket 622 using at least one fastener 203.

The fasteners 203 may secure the torsion spring 126 to the bracket 622 using fastening holes 630. The fastening holes 630 may extend through the spring mount 600 and be substantially perpendicular or otherwise transverse to the flat surface of the mounting portion. In some examples, the anchor 240 (see FIG. 2B) is fastened to the spring mount 600 or the torsion spring 126 and extends between a fastening hole 630 on the upper arm 616 and a fastening hole 630 on the lower arm 618. The anchor 240 prevents the torsion spring 126 from rotating with respect to the bracket 622 and the wall 108. In this way, the torsion spring 126 is held with respect to the spring mount 600, the bracket 622 being mounted to structure. In some examples, the fastening holes 630 are oblong, allowing the anchor 240 to be secured to the spring mount 600 at a variety of different places. As such, based on where the anchor 240 is fastened to the spring mount 600, the dimensions of the opening 620 are variable. This allows the spring mount 600 to accommodate a variety of components, styles, shapes, and sizes of the torsion system 104.

As described above, the spine portion 604 extends between and connects the spring mount 600 and the trolley mount 602. The spine portion 604 integrates the spring mount 600 and the trolley mount 602 into a one-piece bracket. In some examples, as shown in FIG. 6, at least a part of the spine portion 604 is positioned vertically between the spring mount 600 and the trolley mount 602. In other examples, the spine portion 604 comprises all of the mounting portion, the arms of the spring mount 600 and the arms of the trolley mount 602 extending substantially perpendicularly from the spine portion 604.

The spine portion 604 provides additional support for the spring mount 600 and the trolley mount 602 and may increase the overall strength of the spring and trolley bracket 622. The spine portion 604, in some examples, provides additional surface area to be abutted against the wall 108 than if a spring bracket and a trolley bracket were used independent of one another. This is advantageous as it decreases the amount of stress applied to the wall 108 or the header, minimizing the chance that the bracket 622 will pull away from the wall 108 or the header due to the forces applied to the bracket 622 by the torsion system 104 and the barrier operator system 106.

Figure 8:
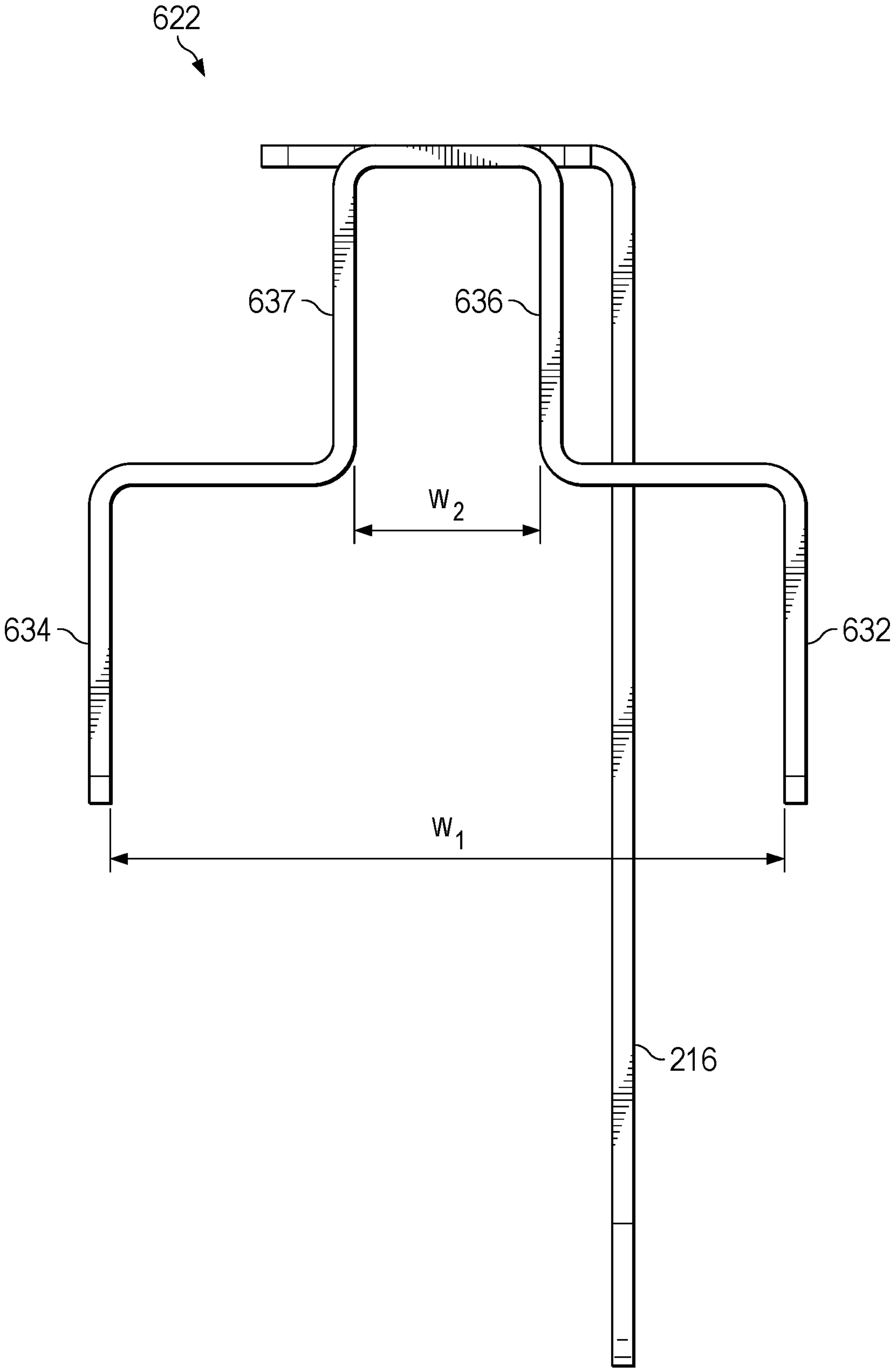
FIG. 8 is a top view of a spring and trolley bracket, according to examples of the present disclosure.

The trolley mount 602 may include a part of the mounting portion and at least one arm extending substantially transverse to the flat surface of the mounting portion. For example, the trolley mount 602 includes an arm 632 and an arm 634. As shown in FIG. 8, the arm 632 and the arm 634 are horizontally separated to define a width $W_1$ therebetween for receiving the wide trolley track 118A. The trolley mount 202 may further include an arm 636 and an arm 637 extending. The arm 636 and the arm 637 are horizontally separated to define a width $W_2$ for receiving the narrow trolley track 118B. The width $W_1$ may be greater than the width $W_2$. In this way, the bracket 622 is able to accommodate a variety of components (e.g., trolley tracks), styles, shapes, and sizes of barrier operator systems. In some examples, the width $W_2$ is greater than the width $W_1$. The Width $W_2$ is centered about the Width $W_1$. This allows the bracket 622 to be positioned similarly with respect to the movable barrier system 100 regardless of whether the movable barrier system 100 uses the wide trolley track 118A or the narrow trolley track 118B. It is understood that in other examples the arms of the trolley mount 602 can be vertically separated to accommodate the trolley track 118.

At least one fastener (e.g., the fastener 205) may secure the trolley track 118 to the bracket 622 using fastening holes 638. The fastening holes 638 may be placed at multiple locations on the at least one arm of the trolley mount 602 to provide further optionality during installation of the movable barrier system 100. As shown, the fastening holes 638 may be substantially perpendicular or otherwise transverse to the flat surface of the mounting portion.

Figure 9:
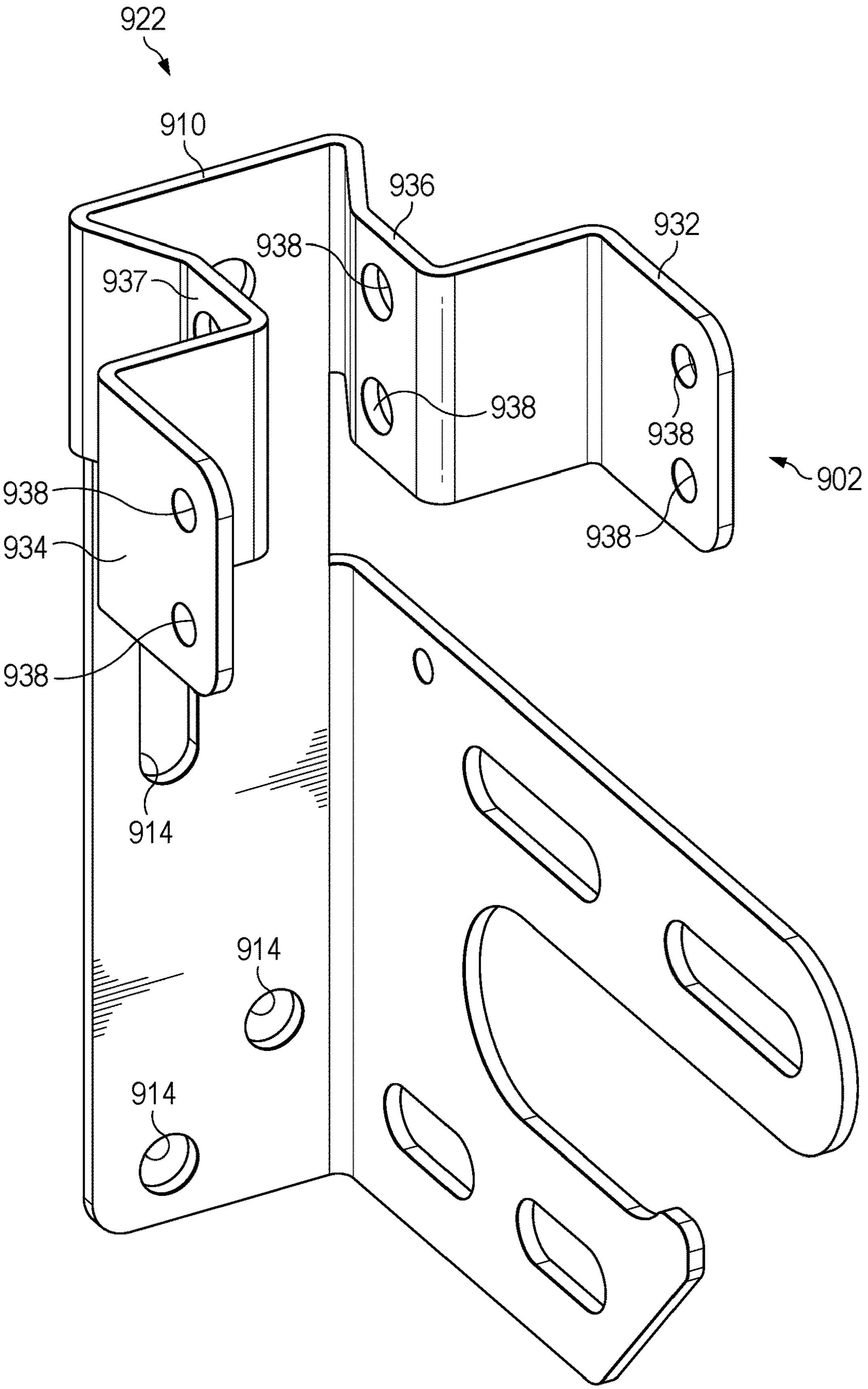
FIG. 9 is a perspective view of a spring and trolley bracket, according to examples of the present disclosure.
Figure 10:
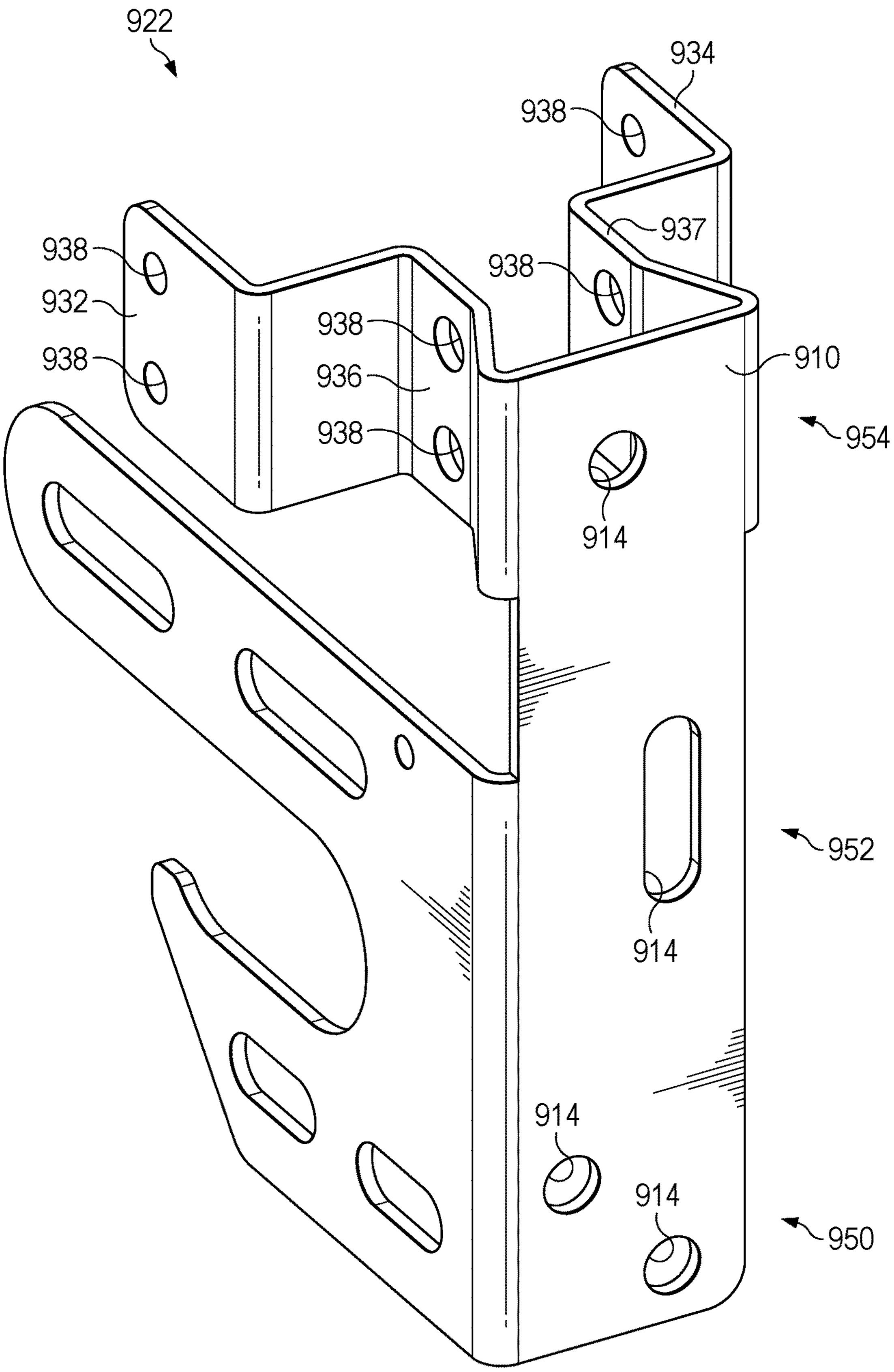
FIG. 10 is a perspective view of a spring and trolley bracket, according to examples of the present disclosure.
Figure 11:
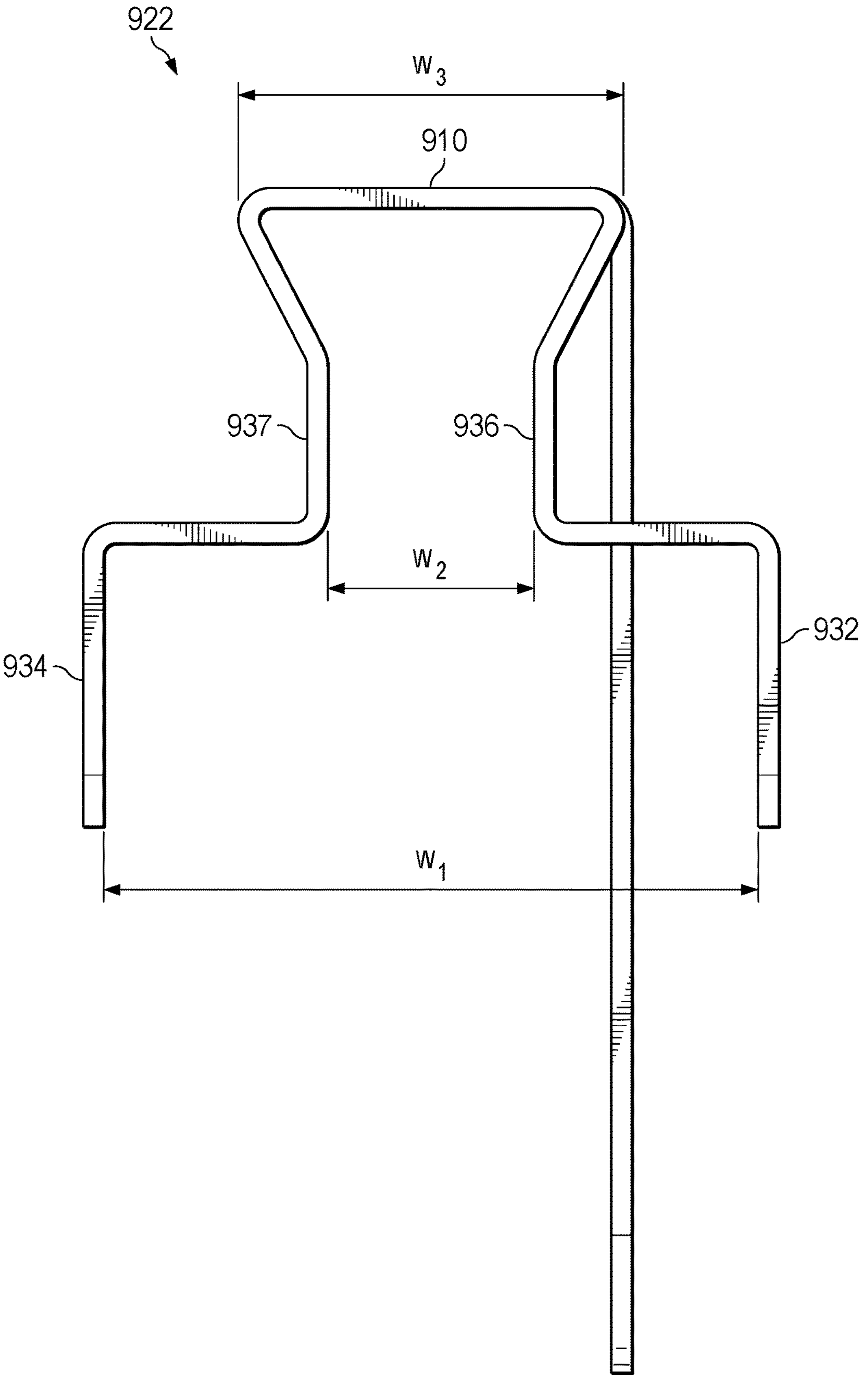
FIG. 11 is a top view of a spring and trolley bracket, according to examples of the present disclosure.

FIGS. 9-11 show an example of bracket 922 which is similar, in some ways, to the example bracket 622 described with respect to FIGS. 6-8. For sake of brevity and to minimize unnecessary repetition, the below paragraphs will focus on the differences between the example bracket 922 and the example bracket 622. However, it is understood that the bracket 922 may include some or all of the features of the brackets 122, 222, and 622 previously described.

One feature of the bracket 922 that is different from the bracket 622 is the location of the mounting holes 914 (e.g., the mounting holes 214, 614). As shown, two mounting holes 914 may be defined in a bottom portion 950 of the bracket 922, an oblong mounting hole 914 may be defined in a middle portion 952, and a mounting hole 914 may be defined in a top portion 954. Any location of the mounting holes in the brackets described herein. In some examples, the location of the mounting holes on the bracket allow for a simpler mounting installation process. In some examples, the location of the mounting holes in the bracket strengthens the connection between the bracket (e.g. the bracket 222, 622, 922) and the structure (e.g., the wall 108, the header).

Another feature of the bracket 922 that is different from the bracket 622 is the dimensions of the flat surface of the mounting portion 910 (e.g., the mounting portion 210, 610) of the trolley mount 902. The flat surface of the mounting portion 910 of the trolley mount 902 is larger than the flat surface of the mounting portion 610 of the trolley mount 602. Increasing the size of the flat surface of the mounting portion 910 may increase the strength and stability of the connection between the bracket 922 and the structure. In some examples, the width $W_3$ of the mounting portion 910 is larger than the width $W_2$ between the arms which are configured to secure the narrow trolley track 118B, but smaller than the width $W_1$ between the arms which are configured to secure the wide trolley track 118A.

Another feature of the bracket 922 that is different from the bracket 622 is the height of the arms on the trolley mount 902. The arms 932, 934, 936, and 937 have a height that is greater than the corresponding arms 632, 634, 636, and 637 on the bracket 622. The larger heights of the arms allows for additional fastening holes 938 to be defined therein. The larger quantity of fastening holes 938 makes the bracket 922 more versatile and capable of use with a wider variety of movable barrier systems 100.

Figure 12:
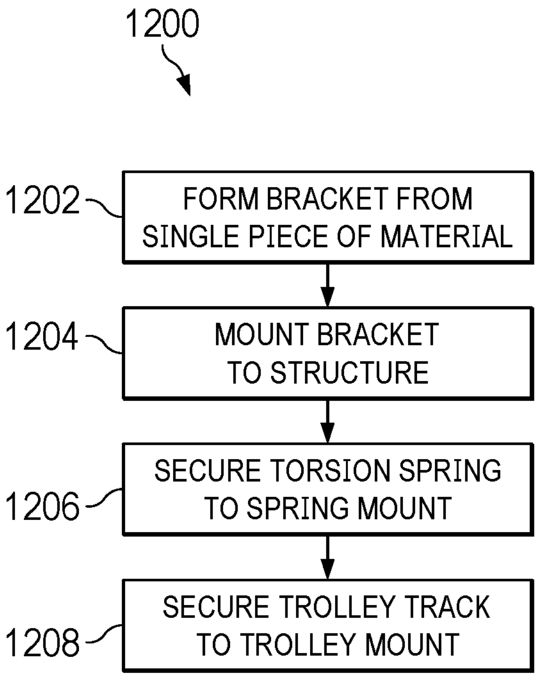
FIG. 12 is a flow chart of a method for securing a movable barrier system to structure, according to examples of the present disclosure.

FIG. 12 shows an example of a method 1200 for securing the movable barrier system 100 to structure, according to examples of the present disclosure. While FIG. 12 illustrates operations according to one example, other examples may omit, add to, reorder, and/or modify any of the operations shown in FIG. 12.

At operation 1202, in some examples, the method 1200 may start by forming a one-piece bracket (e.g., the bracket 122, 222, 622, 922) from a single piece of material. The bracket may be cut from a piece of aluminum or other metal. Certain cuts or perforations may be put into the bracket to facilitate formation. The bracket may be bent or otherwise folded manually or automatically to form the features of the brackets described above. Mounting holes and fastening holes may be punched or drilled into the bracket either before or after the single piece of material is deformed.

Operation 1204, in some examples, includes mounting the one-piece bracket to the structure (e.g., the wall 108, the header). Mounting the bracket to the structure may include abutting a flat surface of a mounting portion of the bracket against the structure. As described above with respect to the brackets 222, 622, 922, at least one of the spring mount, the trolley mount, and the spine portion may comprise a mounting portion. In some examples, all of the spring mount, the trolley mount, and the spine portion comprise the mounting portion. Mounting the bracket to the structure may include inserting fasteners (e.g., fasteners 201) through mounting holes (e.g., the mounting holes 214, 614, 914) that are defined in the flat surface of the mounting portion of the bracket.

Operation 1206, in some examples, includes securing a torsion spring (e.g., the torsion spring 126) of the torsion system 104 to a spring mount (e.g., the spring mount 200, 600, 900). This operation may include inserting the torsion spring through an opening (e.g., the opening 220, 620, 920) defined between a plurality of arms of the spring mount. Rotation of the torsion spring with respect to the bracket and the wall may be limited using an anchor (e.g., the anchor 240). The anchor can be fastened to the spring mount using fasteners inserted through fastening holes (e.g., the fastening holes 230, 630, 930) defined in the arms of the spring mount.

Operation 1208, in some examples, includes securing a trolley track (e.g., the trolley track 118, 118A, 118B) to the trolley mount (e.g., the trolley mount 202, 602, 902). This operation may include inserting the trolley track into a width (e.g., the width $W_1$ or $W_2$ of the trolley mounts 202, 602, 902) defined between a plurality of arms of the trolley mount. The trolley track may be locked with the trolley mount using a pin or fastener (e.g., the fastener 205). The pin can be inserted through fastening holes (e.g., the fastening holes 238, 638, 938) defined in the arms of the trolley mount.

The example described herein is a spring and trolley bracket for use with a movable barrier system. However, in other embodiments, the spring and trolley bracket may be used with any other systems that require securing components to structure. For examples, the brackets described herein can be used in securing components other to structure besides a torsion spring and a trolley track.

The methods described herein are illustrated as a set of operations or processes. Not all of the illustrated processes may be performed in all examples of the methods. Additionally, one or more processes that are not expressly illustrated or described may be included before, after, in between, or as part of the example processes. In some examples, one or more of the processes may be performed by a controller and/or may be implemented, at least in part, in the form of executable code stored on non-transitory, tangible, computer or machine-readable media that when run by one or more processors may cause the one or more processors to perform one, some, or all of the processes described in relation to the methods herein. Elements illustrated in block diagrams herein may be implemented with hardware, software, firmware, or any combination thereof. One block element being illustrated separate from another block element does not necessarily require that the functions performed by each separate element requires distinct hardware or software but rather they are illustrated separately for the sake of description.

In some instances, well-known methods, procedures, and components have not been described in detail so as not to unnecessarily obscure aspects of the examples. While certain exemplary examples of the present disclosure have been described and shown in the accompanying drawings, it is to be understood that such examples are merely illustrative of and not restrictive on the broad disclosure herein, and that the examples of the present disclosure should not be limited to the specific constructions and arrangements shown and described, since various other modifications may occur to those ordinarily skilled in the art.

What is claimed is:

1. A one-piece bracket for securing a movable barrier system, comprising:
- a spring mount configured to secure a torsion spring of the movable barrier system;
- a trolley mount configured to secure a trolley track of the movable barrier system, the trolley mount comprising:
  - a first arm and a second arm horizontally separated to define a first width therebetween for receiving the trolley track; and
  - a third arm and a fourth arm horizontally separated to define a second width therebetween for receiving the trolley track; and
- a spine portion extending between and connecting the spring mount to the trolley mount in a fixed relationship, at least one of the spring mount, the trolley mount, and the spine portion comprising a mounting portion for fixation of the bracket to a structure, each of the first, second, third, and fourth arms having a proximal end and a distal end, each proximal end being positioned closer to the spine portion than each respective distal end, wherein the proximal end of one or more of the first, second, third, or fourth arms is distally spaced from the spine portion in a direction transverse to a plane defined by the spine portion.

2. The bracket of claim 1, wherein the spring mount, the trolley mount, and the spine portion are formed from a single piece of material.

3. The bracket of claim 1, wherein the mounting portion comprises a flat surface configured to abut against the structure.

4. The bracket of claim 3, wherein the spring mount comprises: a part of the mounting portion and at least one arm extending substantially transverse to the flat surface.

5. The bracket of claim 4, wherein the at least one arm of the spring mount comprises an upper arm and a lower arm, the upper and lower arms being vertically separated to define an opening therebetween for receiving the torsion spring.

6. The bracket of claim 5, wherein the lower arm comprises a proximal end attached to the mounting portion and a distal end, the distal end having a lip for maintaining the torsion spring within the opening while the torsion spring is secured using fasteners.

7. The bracket of claim 3, wherein the trolley mount comprises: a part of the mounting portion.

8. The bracket of claim 1, wherein the first width is greater than the second width.

9. The bracket of claim 1, wherein one of the first width and the second width is distally spaced from the other of the first width and the second width in the direction transverse to the spine portion.

10. A movable barrier system, comprising:
- a one-piece bracket mounted to a structure by a mounting portion, the one-piece bracket comprising:
  - a spring mount;
  - a trolley mount comprising:
    - a first arm and a second arm horizontally separated to define a first width therebetween for receiving a trolley track; and
    - a third arm and a fourth arm horizontally separated to define a second width therebetween for receiving the trolley track; and
  - a spine portion extending between and connecting the spring mount to the trolley mount in a fixed relationship, at least one of the spring mount, the trolley mount, and the spine portion comprising the mounting portion, each of the first, second, third, and fourth arms having a proximal end and a distal end, each proximal end being positioned closer to the spine portion than each respective distal end, wherein the proximal end of one or more of the first, second, third, or fourth arms is distally spaced from the spine portion in a direction transverse to a plane defined by the spine portion;
- a torsion spring secured to the spring mount; and
- the trolley track secured to the trolley mount.

11. The movable barrier system of claim 10, wherein the one-piece bracket is formed from a single piece of material.

12. The movable barrier system of claim 10, wherein a flat surface of the mounting portion is abutted against the structure.

13. The movable barrier system of claim 10, wherein the torsion spring is part of a torsion system.

14. The movable barrier system of claim 13, wherein the spring mount comprises an upper arm and a lower arm vertically separated to define an opening therebetween, and wherein rotation of the torsion spring with respect to the one-piece bracket is limited using an anchor.

15. The movable barrier system of claim 10, wherein the trolley track is part of a barrier operator system.

16. The movable barrier system of claim 15, wherein the first width is greater than the second width.

17. The movable barrier system of claim 10, wherein the trolley track is secured within the first width or within the second width.

18. A method for securing a movable barrier system to structure, comprising:

mounting a one-piece bracket to the structure, the bracket comprising:

a spring mount;

a trolley mount comprising:

a first arm and a second arm horizontally separated to define a first width therebetween for receiving a trolley track; and a third arm and a fourth arm horizontally separated to define a second width therebetween for receiving the trolley track; and a spine portion extending between and connecting the spring mount to the trolley mount in a fixed relationship, at least one of the spring mount, the trolley mount, and the spine portion comprising a mounting portion for mounting the bracket to the structure, each of the first, second, third, and fourth arms having a proximal end and a distal end, each proximal end being positioned closer to the spine portion than each respective distal end, wherein the proximal end of one or more of the first, second, third, or fourth arms is distally spaced from the spine portion in a direction transverse to a plane defined by the spine portion;

securing a torsion spring to the spring mount; and securing the trolley track to the trolley mount.

19. The method of claim 18, wherein mounting the bracket to the structure comprises abutting a flat surface of the mounting portion against the structure.

* * * * *